Aug. 16, 1932.   A. GIAMBERTONI   1,872,078
FAN
Filed April 13, 1931   3 Sheets-Sheet 1

INVENTOR
Andrea Giambertoni
By Watson, Coit, Morse & Grindle
Attys

Aug. 16, 1932. A. GIAMBERTONI 1,872,078
FAN
Filed April 13, 1931 3 Sheets-Sheet 2

INVENTOR
Andrea Giambertoni,
By Watson, Coit, Morse & Grindle
Attys

Aug. 16, 1932. A. GIAMBERTONI 1,872,078

FAN

Filed April 13, 1931 3 Sheets-Sheet 3

INVENTOR

Andrea Giambertoni;

By Watson, Coit, Morse & Grindle
Attys

Patented Aug. 16, 1932

1,872,078

UNITED STATES PATENT OFFICE

ANDREA GIAMBERTONI, OF MILAN, ITALY, ASSIGNOR TO THE FIRM SOCIETA COSTRUZIONE APPARECCHI ELETTRODOMESTICI MARELLI, OF MAILAND, ITALY

FAN

Application filed April 13, 1931, Serial No. 529,813, and in Italy January 28, 1930.

This invention relates to an electrically driven fan, the motor and blade wheel of which are arranged in an air channel of a convenient casing made of wood, insulating material or porcelain, containing at the same time an adjustable spraying device for scent or disinfectant and also an electric heating device, and which in this form represents a novel domestic and office appliance. The fan can also be built into a cupboard or other piece of furniture.

The possibilities of using the fan are considerably increased in that an air current is produced therewith, which can be adjusted within wide limits. This adjustment is effected firstly by throttling to a greater or lesser extent the air current by means of apertures in the cover plate of the air channel on the suction side of the blade wheel and further by the adjustability of the speed of rotation of the motor. This motor is mounted in the casing with the interposition of an electric sound insulating layer so that a silent running of the motor is ensured. Moreover the air channel casing is sound-proof insulated on its bearing surface by means of rubber feet.

In a side wall of the casing a dish adapted to be easily swung out and to accommodate the liquid to be sprayed or atomized, is arranged, this dish being covered inside the casing by two superposed mutually adjustable plates provided with apertures. The upper plate is fitted with a control knob outside the casing and by its displacement relative to the lower plate covers more or less the dish containing the liquid to be sprayed.

The perforated cover plate of the air channel in the front casing wall, when the fan is fitted in a piece of furniture, may be adapted thereto, as regards its shape and decoration. This plate serves for carrying an easily removable large surface electric heated element, for the protection of which the apertures in the plate are covered with wire netting. The heating wire is arranged, for example in the shape of a spiral in comb-like incisions of arms of the heating element, provided with mica inserts and preferably arranged in the shape of a star.

An embodiment of the invention is illustrated by way of example in the accompanying drawings in which:—

Figure 1:
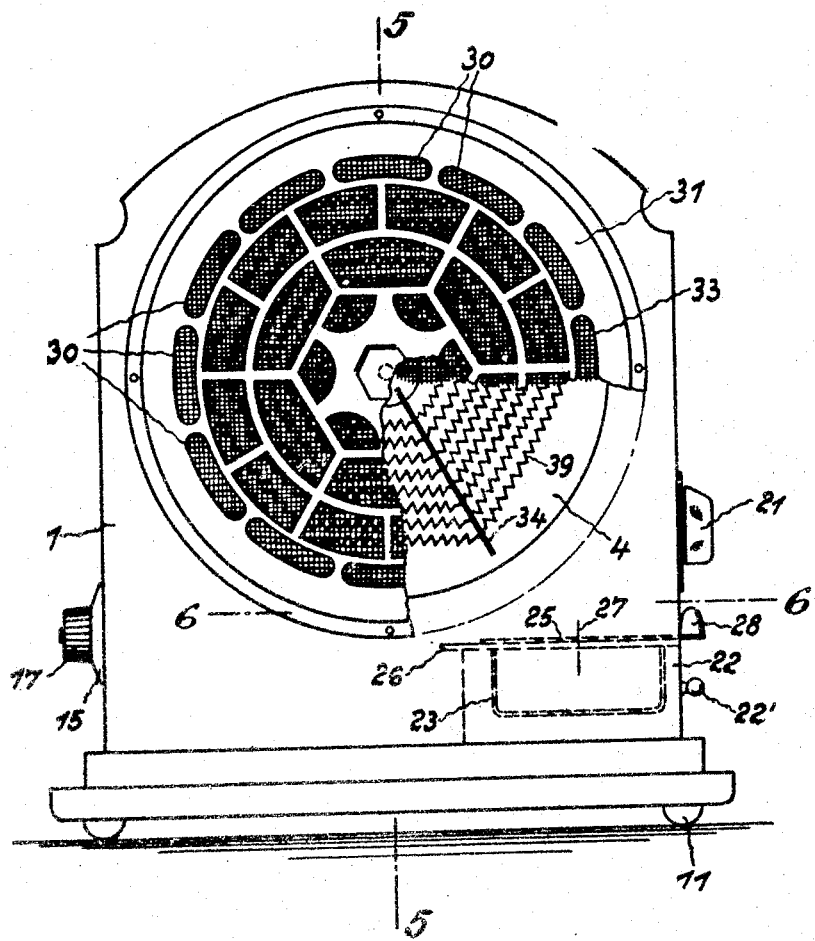
Fig. 1 shows the fan in front elevation, the closing wall of the air channel being partly removed.
Figure 6:
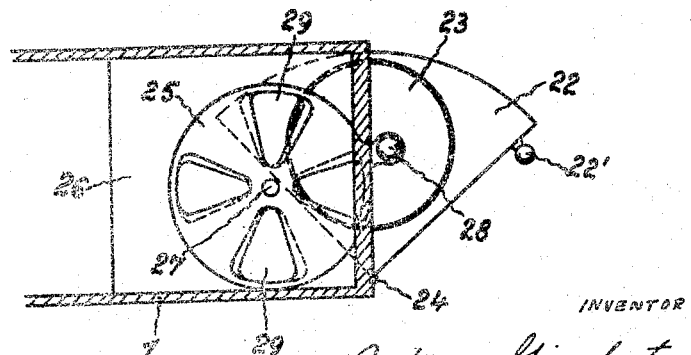
Fig. 6 shows the swing-out dish for the substance to be sprayed and the adjustable covering device, seen from line 6—6 of Fig. 1.
Figure 2:
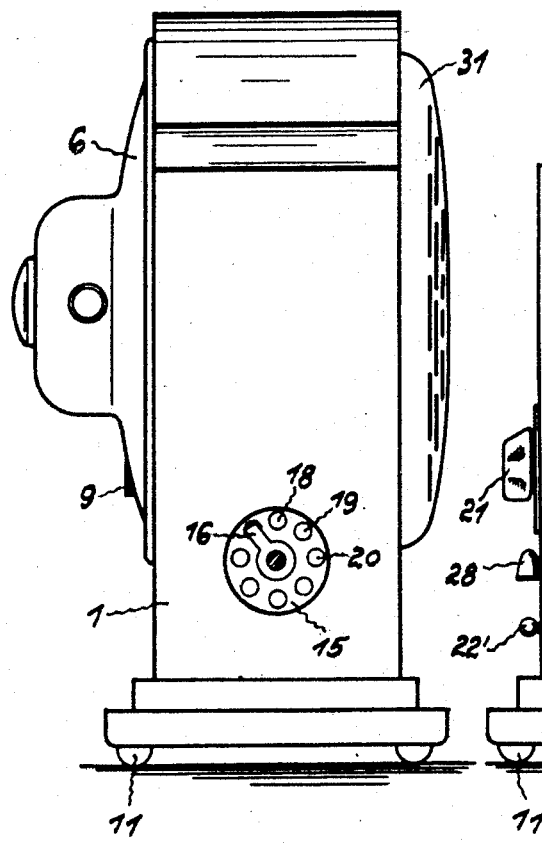
Fig. 2 shows in side elevation the casing made of precious wood with the regulator for the running speed of the motor, the covering plate therefore being removed.
Figure 3:
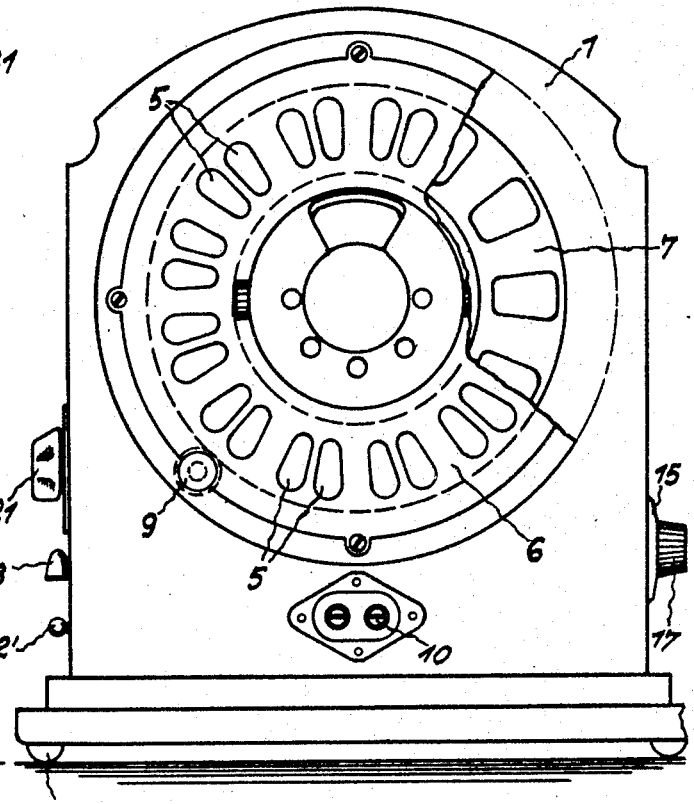
Fig. 3 is a rear elevation of the casing, the cover plate for the air channel being partly removed.
Figure 4:
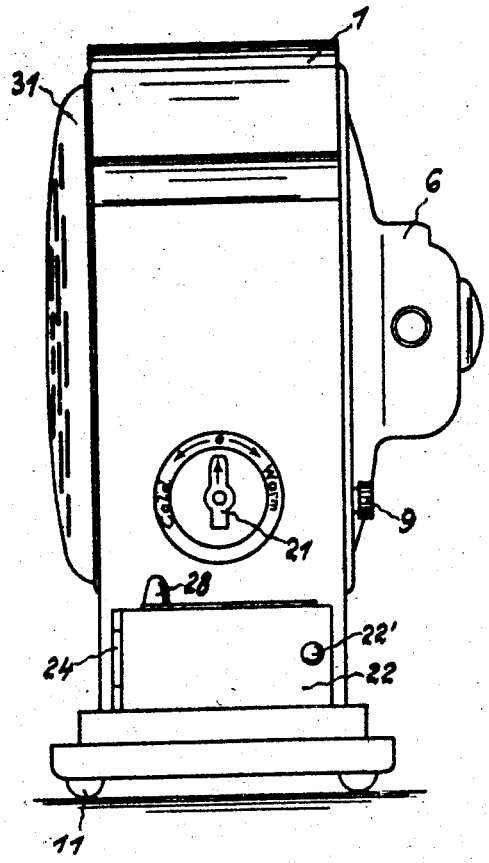
Fig. 4 shows the other side elevation of the casing with the arrangement of the main switch and the swing-out dish for the substance to be sprayed.
Figure 5:
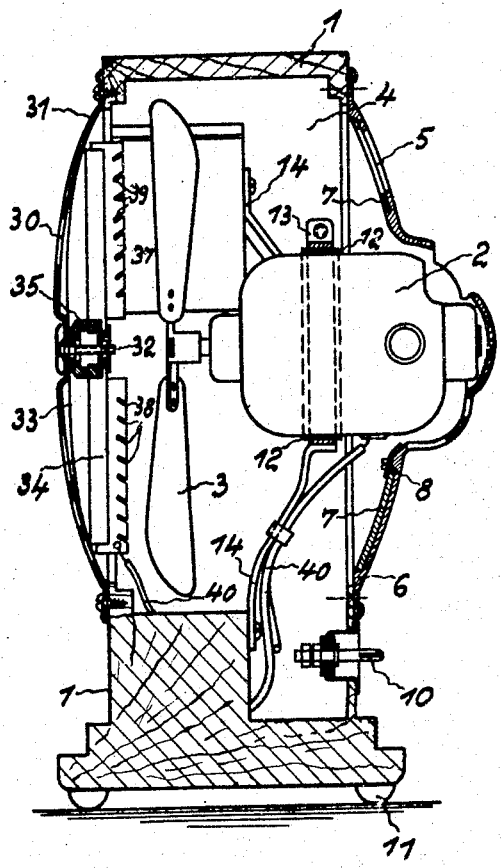
Fig. 5 is a vertical section through the fan on line 5—5 of Fig. 1.
Figure 7:
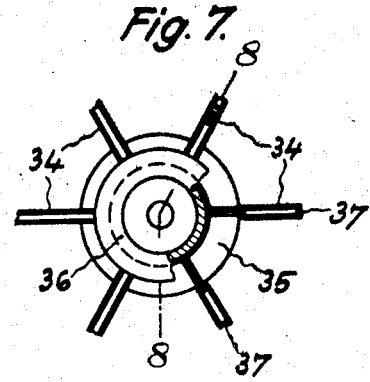
Fig. 7 shows in elevation, partly in section the hub of the electric heating element with the star-shaped arrangement of the arms for carrying the electric resistance.
Figure 8:
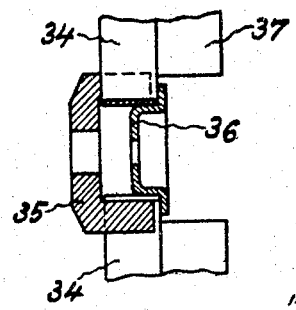
Fig. 8 is a section on line 8—8 of Fig. 7.

A casing 1 accommodates an electric motor 2 serving for driving a blade wheel 3. The casing 1 is provided with a continuous air channel 4, the mouth of which in the rear wall of the casing 1 is covered by a plate 6, provided with apertures 5. On the inner side of the plate 6 an adjusting ring 7, also provided with apertures is pivoted around the centre of the plate 6, provided with a cavity corresponding to the size of the driving motor, and secured by means of a holder 8. The fluted outer edge of the adjusting ring 7, provided with apertures, engages with a fluted driving disc 9 (Fig. 3) for shifting the adjusting ring 7, so that the apertures in the adjusting ring and in the plate 6 more or less register for regulating the air current. The arrangement is however such, that the apertures 5 of the plate 6 cannot be entirely closed by the adjusting ring 7.

Current connection plugs 10 for connecting the lead wires are preferably provided on the rear side of the casing 1, which is sound-proof insulated on its supporting surface by means of rubber feet 11, so as to obtain a silent running of the fan. For this purpose the driving motor 2 is also mounted in the air channel casing 1 with the interposition of elastic inserts. In the form of construction illustrated, the motor casing 2 is surrounded by a rubber strip 12, over which a clamping ring 13 engages, connected to the casing 1 by means of holding arms 14. The arrangement may however be such, that the elastic intermediate layers be directly between the holding arms 14 and the casing 1.

For regulating the speed of rotation of the motor a resistance regulator 15 is arranged in one side wall of the casing 1, the sliding contact 16 of which regulator can be adjusted to the different contacts of the speed steps 18, 19, 20, etc., by means of a knurled knob 17. On the opposite side of the casing 1 the main switch 21 is arranged, which serves at the same time for switching-in the heating current. The switch plate is therefore provided with suitable inscriptions and switching indications. A swing door part 22, provided with a handle 22' and adapted to be easily swung out preferably on a hinge 24, is also mounted in one of the side walls of the casing 1 and carries a dish 23 for accommodating the liquids to be sprayed. For regulating the spraying of scent and disinfectant two plates 25 and 26, provided with apertures, are arranged superposed in the casing 1. The upper plate 25 is adapted to pivot around a stationary point 27 by means of a control knob 28, situated outside the casing. The two plates 25 and 26 are provided with apertures 29, which can be more or less closed by shifting the one plate relatively to the other.

The air channel aperture in the front wall of the casing 1 is covered by an easily removable plate 31, provided with apertures 30. On the inner side of the plate 31 an electric heating element is easily detachably secured by means of screws 32. In order to protect the heating elements being touched from the outer side, the cover plate 31, in the form of construction illustrated, is covered on its inner side with a wire netting 33. The electric heating element is star-shaped in the example illustrated, its holding arms 32 converging into hub 35 and held at this point by means of a sleeve 36. The holding arms 36 are provided with mica inserts 37, which carry the heating wire 39 in comb-like inclined incisions 38. In order to obtain a greater heating surface, the heating wire 39 in the example illustrated, is wound in spiral shape. However the holding arms for the heating wire may also be so arranged that the wire is wound in some other shape. The large surface construction of the heating element effects an absolutely uniform heating of the air current. Electric wires 40, preferably arranged in the interior of the casing 1 or of the air channel 4, serve for supplying current to the driving motor and the electric heating element.

I claim:

1. A fan, comprising in combination a casing having a continuous air channel, an electric motor mounted in said casing, a blade wheel in the air channel of said casing adapted to be driven by said electric motor, an adjustable device for spraying scent and disinfectant arranged in said casing, said device comprising a dish hingedly mounted on a wall of the casing and adapted to accommodate the substance to be sprayed, and two apertured superposed mutually adjustable plates in said casing adapted to cover said dish.

2. A fan, comprising in combination a casing having a continuous air channel, an electric motor mounted in said casing, a blade wheel in the air channel of said casing adapted to be driven by said electric motor, an adjustable device for spraying scent and disinfectant arranged in said casing, a readily removable disc on the front wall of said casing having apertures therein, a wire netting covering the apertures of said disc, and large surface, easily removable electric heating elements in said casing behind said wire netting.

3. A fan, comprising in combination a casing having a continuous air channel, an electric motor mounted in said casing, a blade wheel in the air channel of said casing adapted to be driven by said electric motor, an adjustable device for spraying scent and disinfectant arranged in said casing, a readily removable disc on the front wall of said casing having apertures therein, a wire netting covering the apertures of said disc, and large surface, easily removable star-shaped electric heating elements in said casing behind said wire netting.

4. In apparatus of the class described, the combination with a casing having a portion forming a substantially cylindrical air channel, of a motor supported by said casing, fan blades driven by said motor, said blades being positioned within said channel and extending into close proximity thereto, a receptacle for scent or disinfectant supported by said casing and communicating with said channel, an adjustable closure device interposed between said receptacle and said channel for regulating the flow of scent or disinfectant laden air through the latter, and an electric heating element disposed in front of said fan blades and extending over a major portion of the cross-sectional area of said channel.

5. In apparatus of the class described, the combination with a casing having a portion forming a substantially cylindrical air channel, of a motor supported by said casing, fan blades driven by said motor, said blades being positioned within said channel and extending into close proximity thereto, a receptacle for scent or disinfectant supported by said casing and communicating with said channel, an adjustable closure device interposed between said receptacle and said channel for regulating the flow of scent or disinfectant laden air through the latter, an electric heating element disposed in front of said fan blades and extending over a major portion of the cross-sectional area of said channel, and an adjustable closure device at the rear of said channel for regulating the quantity of fresh air passing therethrough.

In testimony whereof I affix my signature.

ANDREA GIAMBERTONI.